United States Patent [19]

Koene et al.

[11] Patent Number: 4,534,983

[45] Date of Patent: Aug. 13, 1985

[54] PROCESS FOR FLAVORING DRY VEGETABLE MATTER

[75] Inventors: Casper H. Koene, Hamburg, Fed. Rep. of Germany; Cornelis Vos; Jan Brasser, both of Huizen, Netherlands

[73] Assignee: Naarden International N.V., Naarden-Bussum, Netherlands

[21] Appl. No.: 507,789

[22] Filed: Jun. 24, 1983

[30] Foreign Application Priority Data

Oct. 14, 1982 [NL] Netherlands ............... 8203963

[51] Int. Cl.$^3$ .................... A23F 3/40; A23L 1/22
[52] U.S. Cl. ............................ 426/293; 426/289; 426/597; 426/638; 426/96; 426/102
[58] Field of Search ............... 426/597, 293, 650, 638, 426/291, 289

[56] References Cited

U.S. PATENT DOCUMENTS

| 1,556,472 | 10/1925 | Bailey | 426/293 |
|---|---|---|---|
| 1,602,826 | 10/1926 | Kuhn | 426/293 |
| 2,582,188 | 1/1952 | Zaloom | 426/293 |
| 3,550,598 | 12/1970 | McGlumphy et al. | |
| 3,561,981 | 2/1971 | Roe et al. | 426/293 X |
| 3,911,145 | 10/1975 | Marion | |
| 4,001,438 | 1/1977 | Marmo et al. | 426/96 |
| 4,076,847 | 2/1978 | Johnson | |
| 4,253,473 | 1/1977 | Marmo et al. | |

FOREIGN PATENT DOCUMENTS

| 3006092 | 10/1981 | Fed. Rep. of Germany | 426/597 |
|---|---|---|---|
| 8103077 | 8/1981 | France | |
| 1117227 | 6/1968 | United Kingdom | |
| 1251079 | 10/1971 | United Kingdom | 426/597 |
| 2074838 | 11/1981 | United Kingdom | 426/597 |
| 2095968 | 10/1982 | United Kingdom | 426/597 |

OTHER PUBLICATIONS

Chemical Abstracts, vol. 90, No. 3, Jan. 1979, Ref. No. 19278b.
Chemical Abstracts, vol. 96, No. 6, Mar. 1982, Ref. No. 82959p.

*Primary Examiner*—Joseph Golian
*Attorney, Agent, or Firm*—Michael N. Meller

[57] ABSTRACT

Process for flavoring dry vegetable material, especially pieces of leaf and stem like tea, herbs, spices and vegetables by mixing the dry vegetable material with one or more micro-encapsulated flavors as well as with an aqueous adhesive solution containing such quantity of water that said quantity may at least be adsorbed for the most part by the vegetable material, continuing the mixing operation till a dry or almost dry product is obtained and then, if necessary, subjecting the obtained product to a drying operation respectively reduction operation.

26 Claims, No Drawings

PROCESS FOR FLAVORING DRY VEGETABLE MATTER

The invention concerns a process for flavoring dry vegetable matter, especially pieces of leaf and stem such as tea, herbs, spices and vegetables. The invention also comprises the products obtained by the process according to the invention.

Some vegetable materials, consisting of dry pieces of leaf and/or stem are also sold as flavored products. Thus, tea flavored with bergamot oil has been sold for decades under the demonination of "Earl Grey". Recently the demand for tea flavored with other aromas is growing.

The most important prior art method of flavoring consists of spraying or atomizing a liquid flavor, sometimes diluted with a suitable solvent e.g. alcohol, over the bulk of the tea. The main disadvantage of this method is that the flavor, being very finely dispersed over a great surface area, evaporates rapidly and is susceptible to oxidative deterioration and, consequently, is short lived.

It has been tried to solve this problem using airtight packaging filled with an inert gas, e.g. as described in German Offenlegungschrift No. 3,006,092. However, this is an expensive solution and the problem reappears as soon as the consumer opens the package.

For tea, it has also been tried to solve the evaporation and oxidation problems with powdered, more specifically micro-encapsulated flavors. However, vibrations and shaking, e.g. during packing and transport, cause the fine powdered flavor to separate from the much coarser tea leaves. Eventually, one part of the package contains mainly powdered flavor and the other part mainly tea leaves. To prevent this separation, granulated flavors, with particle size comparable to that of tea leaves have been prepared, as described in British Pat. No. 1,564,001 and in published British Patent Application, No. 2,074,838. However, granulated flavors have to be prepared in a separate process, using specialized equipment. Moreover, such flavor granules are clearly visible within the bulk of the tea, due to their different appearance. This may induce the consumer to suspect the quality of the tea.

Thus, there is a need for a process to affix powdered flavors to dry vegetable material such as tea and minced vegetables, herbs and spices. The product of this process should not contain particles with a foreign appearance, but consist only of particles of the original vegetable material, some of them being covered with flavor powder.

Such a process has been described for tea in the above mentioned British Patent Application No. 2,074,838, using β-cyclodextrin/flavor inclusion complexes as the powdered flavors. These molecular complexes, described by W. Saenger in Angew. Chemie 92 (1982) pp. 343–361 are in most cases only poorly soluble in cold water. Therefore, as described in the above mentioned British Patent Application, they may be made into a suspension in water and dispersed on the tea, without suffering from decomposition. However, due to the high price of β-cyclodextrin, these flavor inclusion complexes are expensive and, consequently, are hardly used in the food industry.

Micro-encapsulated flavors, on the other hand, are extensively used in the food industry. They may be produced in several different ways, e.g. as described by L. L. Balassa and G. O. Fanger in CRC Critical Reviews in Food Technology, July 1971 pp. 245–264. These microcapsules consist of small droplets of flavor oil with a solid envelope of an edible hydrocolloid, such as a vegetable gum, a modified starch or gelatin. However, such microcapsules cannot be used in the process described in the British Patent Application mentioned above. Since they are readily soluble in water, they will disintegrate, thereby releasing the flavor oil which is thus subject to evaporation and oxidation.

Surprisingly, a process has now been found to affix microencapsulated flavors to dry vegetable material such as tea and minced vegetables, herbs and spices, with retention of the original appearance and particle size of the vegetable material. This process comprises the steps of either thoroughly mixing vegetable material and micro-encapsulated flavors, followed by finely dividing a solution of an adhesive material in water over the mixture while continuing the mixing operation, or thoroughly mixing the adhesive solution with the vegetable material, immediately followed by the addition of the microencapsulated flavor while continuing the mixing operation. The process also comprises continuing the mixing operation after the three components mentioned above have been added until the mixture is almost or completely dry and, if necessary, drying the mixture further with air or an inert gas, which may be warmed if desired. The quantity of water, added as a solvent for the adhesive, should be sufficient to ensure complete moistening of the vegetable material and microcapsules with the adhesive solution. On the other hand, the vegetable material should be able to absorb most of the water, to prevent softening or dissolution of the microcapsules to a point where the entrapped flavor oil is released.

Thus, the maximum allowable quantity of water in the adhesive solution also depends on the water absorptive capacity of the vegetable material. Black tea, for instance, contains 5.0–5.5% by weight of water by nature, whereas it may contain up to 12% of water, i.e. take up an additional 6.5–7% before becoming noticeably moist and losing its free flowing character. In general the quantity of water added should be so limited that after the mixing operation the water content of the mixture is at most 5% by weight in excess of the quantity that may be absorbed by the vegetable material. This residual water is evaporated with air or an inert gas until the mixture has a dry appearance, i.e. until the total water content is 12% by weight or less for tea. Preferably the quantity of water should not exceed the figure that can be completely absorbed by the vegetable material, thus obviating the need for an additional drying step. The absorptive capacity of any vegetable material may be easily determined in moistening and drying experiments in a vacuum desiccator. If necessary the absorptive capacity of a vegetable material may be increased by predrying.

The amount of microcapsules to be affixed to a given amount of vegetable material, using the process of the invention, may vary within wide limits and depends on the desired flavor strength in the end product. The maximum amount that may be affixed is related to the available surface area of the vegetable material and is directly proportional to the mean particle size of the microcapsules. Using microcapsules with a mean particle size of 80 μm, the maximum amount is about 350 g of microcapsules per kg of tea. From these data, the maximum amounts for microcapsules with other particle sizes may be derived by simple arithmetic.

In most cases sufficiently high flavor strengths are already attained with much lower quantities of microcapsules. In many cases it is even simpler and cheaper if only a (small) part of the material to be flavored is subjected to the process of the invention. This flavored part is thereafter mixed with the bulk of unflavored material. If this mixing is done immediately after the flavoring process of the invention, it may obviate the need for a separate drying step, even if the flavored vegetable material is not yet completely dry, since the residual water can easily be absorbed by the bulk of unflavored material.

The adhesives used in the process of the invention may be film forming hydrocolloids, comprising vegetable and microbial gums, such as gum arabic, karaya, tragacanth, carragenan etc.; modified starches, such as dextrines, esterified starches etc.; cellulose derivatives such as hydroxypropylcellulose and carboxymethylcellulose; gelatin, casein and comparable proteins and polyvinylalcohol. Alternatively, saccharose and other saccharides which will form a glass on drying may also be used as adhesives. Of course adhesives to be used in the process of the invention must be approved for use in food.

The quantity of adhesive used should be sufficient to secure sufficient adhesion of the microcapsules to the vegetable material, and the minimum amount required depends on its adhesive power. Although 1 g of adhesive per kg of microcapsules may be sufficient in some cases, preferably a quantity of 10 g or more per kg of microcapsules should be used to be on the safe side.

In order to secure a homogeneous distribution of the adhesive through the vegetable material, it is advantageous to spray or atomize the adhesive solution over the vegetable material or the mixture of vegetable material and microcapsules. To this end a spray head or atomizer adjusted in or above the mixing chamber or mixing vessel may be used.

When selecting the hydrocolloid adhesive, it must be taken into account that many of them form highly viscous solutions even in low concentrations. The pressure necessary to disperse a liquid into fine droplets increases with increasing viscosity of that liquid. Solutions with a maximum viscosity of 400 cP may be used on spray heads with a working pressure of 300 Bar. With low pressure spray heads (about 10–15 Bar max.) the viscosity should preferably not exceed 150 cP. However, care should also be taken not to use too diluted solutions to prevent the addition of a quantity of water exceeding the absorptive capacity of the vegetable material. Therefore, adhesives causing only a slight viscosity increase in solution, are preferred when a high microcapsules content is desired, to obtain a high flavor strength. Examples of such adhesives are gum arabic and saccharose.

To prevent differences in color between treated and untreated vegetable material a suitable food color may be added to the adhesive solution. To this end, caramel may be used in the case of tea.

The process according to the invention may be further improved by spraying a small quantity of water miscible organic solvent over the vegetable material or the mixture of vegetable material and microcapsules as the case may be, and thoroughly mixing it through, prior to the addition of the adhesive solution. The absorption of water from the adhesive solution by the vegetable material is thereby slowed down, resulting in a more homogeneous dispersion of the adhesive solution through the bulk of the mixture. This prevents the formation of conglomerates consisting of particles of vegetable material and/or microcapsules, before homogeneous dispersion of the adhesive has occurred. Suitable solvents have to meet the following conditions: they should not or only slightly dissolve the microcapsules; they must be suitable for human consumption, i.e. approved for use in food they should not have an annoying odor or flavor of their own. Examples of such solvents are ethanol, isopropanol, propylene glycol, glycerol and benzyl alcohol.

During the operation of the process of the invention, the organic solvent will partly evaporate and partly be absorbed by the vegetable material, thereby limiting the absorptive capacity available for water absorption. The quantity of adhesive solution to be used later should be adapted accordingly. So, the quantity of solvent to be added and the quantity of adhesive solution to be used are interrelated and both depend on the absorptive capacity of the vegetable material. With material having a great absorptive capacity, enough capacity will be retained after the solvent addition to also take up the water from the adhesive solution. Moreover, especially these materials will benefit most from the addition of the organic solvent to prevent too rapid absorption of water, which causes the formation of undesired conglomerates and lumps. Vegetable material with a high absorptive capacity may tolerate the addition of up to 100 g of organic solvent per kg of end product, especially when that solvent evaporates easily, as is the case with ethanol. However, in most cases 40 g or less per kg end product will suffice to obtain the desired improvement of the process.

The process of the invention may be carried out using mixing equipment which is conventional in the food industry. It is preferred to use a type of mixer which does not cause undue heating of the mixture or damage to the vegetable particles, even on prolonged mixing. In most cases conical mixers are very suitable. When using a mixer which may cause heating or damage the vegetable particles, it may be advantageous to stop the mixing operation before the mixture is dry and thereafter complete drying e.g. with warm air. In order to get a desired particle size distribution, the product may be passed through a sieve and the remainder ground to the desired particle size. This is especially appropriate when drying has been completed after the mixing operation, since this may cause the particles to cling together. It may even be necessary to break and grind the product before sifting. However this does not materially affect the appearance of the end-product.

The following examples serve to illustrate the process according to the invention which, however, is in no way limited thereto.

EXAMPLE I 28 kg tea fannings and 8 kg strawberry flavor microcapsules were mixed during 20 sec. in a 100 l DIOSNA universal Mixer. After that a mixture consisting of 2 kg of a 30% w/w solution of gum arabic in water and 2 kg Caramel DS 50 (manufactured by D. D. Williamson & Co. Ltd, Louisville, Ky, U.S.A.) was added in 15 sec. under thorough mixing, which was continued for a further 30 sec. The mixture was taken from the mixer while still wet, spread out and left to dry overnight. The product was then broken up, ground to a particle size usual for tea fannings and sieved. 40 kg strongly flavored tea fannings were obtained. Tea with a flavor strength suitable for consumption was obtained by mixing 1 part flavored tea and 8 parts unflavored tea.

EXAMPLE II 1,400 g tea fannings and 400 g apple flavor microcapsules were mixed in a 5 l Hobart mixer during 5 minutes. In the same time 40 g of ethanol was sprayed on the mass. Thereafter a mixture of 80 g of a 30% w/w solution of gum arabic, 40 g Caramel DS 50 and 40 g of a 50% w/w saccharose solution was likewise sprayed on the mass under thorough mixing. While mixing was continued for 30 min., the tea mixture turned from a humid into a dry and free flowing product. 2 kg of strongly flavored tea fannings were obtained. Flavor strength proper for consumption was obtained by mixing with 14 kg of unflavored tea.

EXAMPLE III 1,400 g broken leaf tea and 300 g lemon oil microcapsules were mixed in about 30 sec. in a 5 l Hobart mixer, while spraying 40 g of ethanol on the tea. Subsequently, stirring continuously, 100 g of a 15% w/w gum arabic solution was sprayed on the tea in 2-3 minutes. Stirring was continued for a few minutes and another 160 g of tea was added, again mixing a few minutes. 2 kg strongly flavored broken leaf tea were obtained, which were mixed with 12 kg unflavored tea in order to adjust the flavor strength to the level suitable for consumption.

EXAMPLE IV

In a 5 l Hobart mixer 1,560 g tea fannings were mixed during a few minutes with 300 g of bergamot oil microcapsules and simultaneously sprayed with 40 g of ethanol. In 2-3 minutes 100 g of a 0.5% w/w aqueous solution of carboxymethylcellulose (CMC) were sprayed on the tea and mixing was continued for about 45 minutes. 2 kg of dry strongly flavored tea were obtained, which was mixed with 12 kg fresh tea to adjust the flavor level to consumption strength.

EXAMPLE V

The process of Example IV was repeated, using 100 g of a 15% w/w saccharose solution to replace 100 g CMC solution. 2 kg of dry, free flowing flavored tea were obtained.

EXAMPLE VI

The process of Example IV was repeated, spraying with 30 g propylene glycol instead of with 40 g of ethanol. After adding the CMC solution stirring was continued for 1 hour and 1,990 g of dry flavored tea were obtained.

EXAMPLE VII

In a 3,000 l conical mixer 300 kg of tea fannings and 80 kg of orange oil microcapsules were mixed during 30 minutes. Using a sprayhead fitted in the mixer the mixture was sprayed with 8 kg of ethanol (to prevent fire or explosion, oxygen should be expelled from the mixer by flushing with an inert gas, such as $N_2$ or $CO_2$) and subsequently with 20 kg of a 15% w/w gum arabic solution. After mixing another 1½ hours the product had turned from a humid into a dry and free flowing state. It was sieved over a 12 mesh vibratory screen and about 400 kg, strongly flavored tea fannings were obtained.

EXAMPLE VIII

In a 5 l Hobart mixer 60 g of ethanol, followed by 140 g 20% w/w gum arabic solution, were homogeneously dispersed by spraying and mixing through 1,400 g of tea fannings. As soon as possible thereafter 400 g lime oil microcapsules were added and mixed homogeneously through the tea. Mixing was continued until the mass had turned from a humid into a dry and free flowing product. 2 kg of favored tea were thus obtained.

We claim:

1. A process for preparing a flavored dry vegetable product comprising the steps of mixing pieces of leaf and stem of dry vegetable material selected from the group consisting of tea, herbs and spices with microcapsules of at least one microencapsulated flavor and, simultaneously or subsequently spraying said mixture with an organic solvent selected from the group consisting of ethanol, isopropanol, propylene glycol, glycerol and benzyl alcohol in an amount of up to about 100 g/kg of flavored product, adding a finely divided aqueous adhesive solution; and continuing the mixing until a free flowing mixture is obtained in which substantially all liquids have been absorbed, wherein the amount of adhesive is sufficient to provide adhesion of the microcapsules to the vegetable material and the amount of solvent is sufficient to prevent the formation of conglomerates of particles of vegetable material or microcapsules.

2. The process according to claim 1, wherein the quantity of water in the aqueous adhesive solution is such that the water content of the mixture is at most 5% by weight in excess of the quantity that may be absorbed by the vegetable material.

3. The process according to claim 1, wherein the quantity of water in the aqueous adhesive solution is equal to or smaller than the quantity that may be absorbed by the vegetable material.

4. The process according to claim 1, wherein the adhesive is at least one product selected from the group consisting of film forming hydrocolloids and sugars which form a glass on drying.

5. The process according to claim 4, wherein the adhesive is at least one product selected from the group consisting of vegetable and microbial gums, modified starch derivatives, cellulose derivatives, gelatin, casein, polyvinylalcohol and saccharose.

6. The process according to claim 5, wherein the adhesive is at least one product selected from the group consisting of gum arabic and saccharose.

7. The process according to claim 1, wherein at most 40 g organic solvent is used per kg of end product.

8. The process according to claim 1, wherein the mixing step is continued until the mixture is completely dry.

9. The process according to claim 1, wherein the free flowing mixture is subjected to a drying step.

10. The process according to claim 1, wherein the free flowing mixture is subjected to a size reduction operation.

11. The process according to claim 1, wherein the aqueous adhesive solution is added in an amount sufficient to provide at least 1 g of adhesive per kg of microencapsulated flavor.

12. The process according to claim 11, wherein the amount of adhesive is at least 10 g per kg of microencapsulated flavor.

13. The process according to claim 1, wherein the maximum amount of micro-encapsulated flavor in kg per kg of vegetable material is equal to: x/80(0.35), wherein x is the mean particle size of the micro-encapsulated flavor in μm.

14. A process for preparing a flavored dry vegetable product comprising the steps of spraying pieces of leaf and stem of dry vegetable material selected from the group consisting of tea, herbs and spices with an organic solvent selected from the group consisting of ethanol, isopropanol, propylene glycol, glycerol and benzyl alcohol in an amount of up to about 100 g/kg of flavored product and then with an aqueous adhesive solution; adding microcapsules of at least one microencapsulated flavor, and mixing until a free flowing mixture is obtained in which substantially all liquids have been absorbed, wherein the amount of adhesive is sufficient to provide adhesion of the microcapsules to the vegetable material and the amount of solvent is sufficient to prevent the formation of conglomerates of particles of vegetable material or microcapsules.

15. The process according to claim 14, wherein the quantity of water in the aqueous adhesive solution is such that the water content of the mixture is at most 5% by weight in excess of the quantity that may be absorbed by the vegetable material.

16. The process according to claim 14, wherein the quantity of water in the aqueous adhesive solution is equal to or smaller than the quantity that may be absorbed by the vegetable material.

17. The process according to claim 14, wherein the adhesive is at least one product selected from the group consisting of film forming hyrocolloids and sugars which form a glass on drying.

18. The process according to claim 17, wherein the adhesive is at least one product selected from the group consisting of vegetable and microbial gums, modified starch derivatives, cellulose derivatives, gelatin, casein, polyvinylalcohol and saccharose.

19. The process according to claim 18 wherein the adhesive is at least one product selected from the group consisting of gum arabic and saccharose.

20. The process according to claim 14, wherein at most 40 g organic solvent is used per kg of end product.

21. The process according to claim 14, wherein the mixing step is continued until the mixture is completely dry.

22. The process according to claim 14, wherein the free flowing mixture is subjected to a drying step.

23. The process according to claim 14, wherein the free flowing mixture is subjected to a size reduction operation.

24. The process according to claim 14, wherein the aqueous adhesive solution is added in an amount sufficient to provide at least 1 g of adhesive per kg of micro-encapsulated flavor.

25. The process according to claim 24, wherein the amount of adhesive is at least 10 g per kg of microencapsulated flavor.

26. The process according to claim 14, wherein the maximum amount of microencapsulated flavor in kg per kg of vegetable material is equal to: x/80(0.35), wherein x is the mean particle size of the microencapsulated flavor in μm.

* * * * *